United States Patent [19]

McEwen

[11] 4,208,805
[45] Jun. 24, 1980

[54] NAVIGATIONAL CALCULATING DEVICE

[76] Inventor: David M. McEwen, 4010 Keewahdin Rd., North Street, Mich. 48049

[21] Appl. No.: 51,678

[22] Filed: Jun. 25, 1979

[51] Int. Cl.² .............................................. B43L 5/00
[52] U.S. Cl. ..................................... 33/431; 33/453; 33/457
[58] Field of Search .................. 33/424, 425, 426, 427, 33/431, 453, 457, 464, 1 SB, 1 SD, 403; 235/61 NV, 61 GM

[56] References Cited

U.S. PATENT DOCUMENTS

| 1,439,936 | 12/1922 | Wyckoff . | |
|---|---|---|---|
| 1,730,852 | 10/1929 | Jenny . | |
| 2,419,203 | 4/1947 | Edwards | 235/61 GM |
| 2,481,846 | 9/1949 | King . | |
| 2,521,915 | 9/1950 | Hartig . | |
| 3,034,713 | 5/1962 | Kuzenko . | |
| 3,137,443 | 6/1964 | Samuelson . | |
| 3,414,190 | 12/1968 | Lemiesz . | |

FOREIGN PATENT DOCUMENTS

394895 7/1933 United Kingdom .............. 231/61 GM

*Primary Examiner*—Harry N. Haroian
*Attorney, Agent, or Firm*—Harness, Dickey & Pierce

[57] ABSTRACT

This disclosure relates to a new navigational calculating device which provides a mechanical means of solving position finding problems by solving a plane right triangle. It is an alternative to traverse tables, trigonometric formulas, and chart plotting for determining a dead reckoning position. It is particularly useful for small water-going craft in which conventional methods of navigation are difficult or impractical.

13 Claims, 4 Drawing Figures

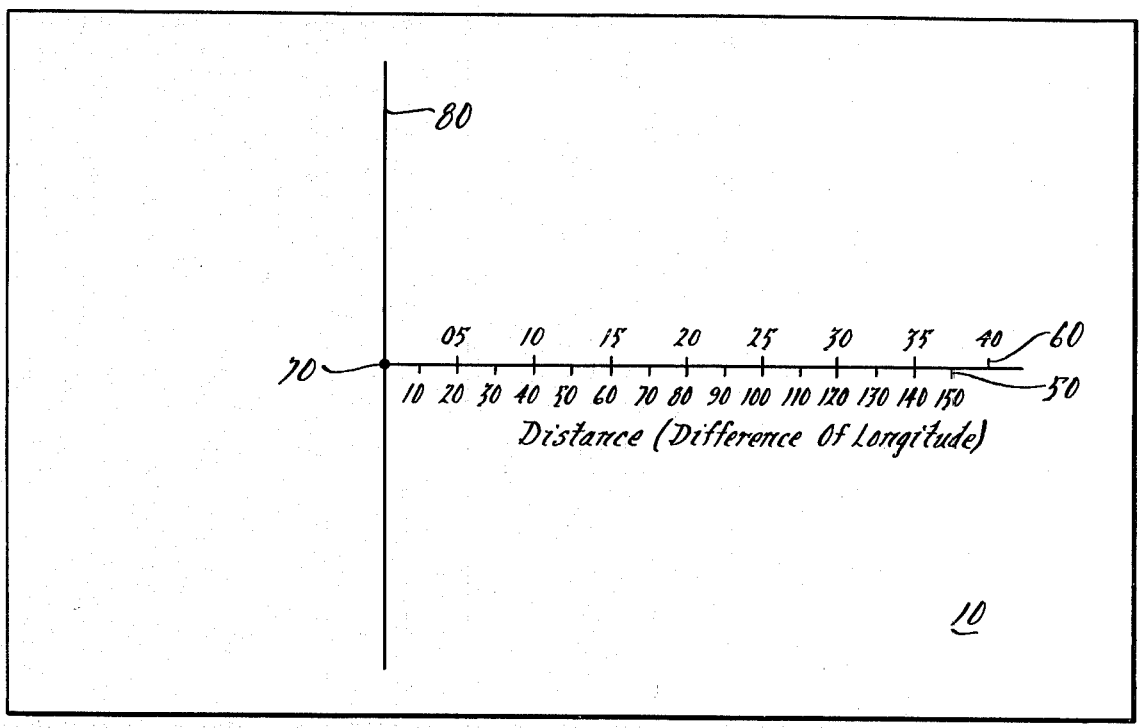
FIG. 2.
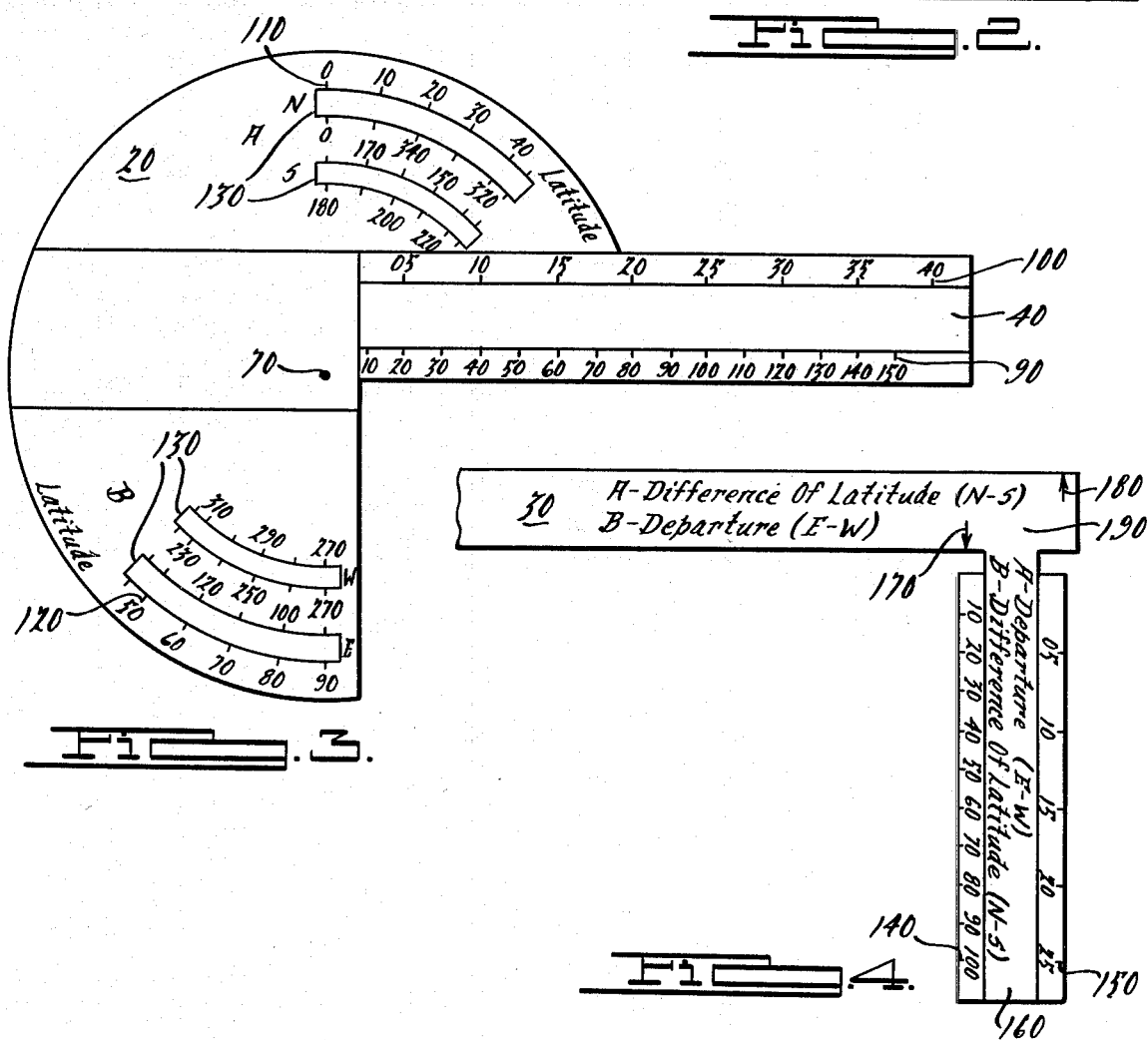
FIG. 3.
FIG. 4.

NAVIGATIONAL CALCULATING DEVICE

BACKGROUND OF THE INVENTION

The present invention pertains primarily to navigational calculating devices, and more particularly to mechanical navigational calculating devices which solve plane right triangles.

The following cited references are believed to be representative of the state of the art:

| U.S. Pat. No. | Inventor(s) | Issued |
|---|---|---|
| 1,439,936 | Wyckoff | December 26, 1922 |
| 1,730,852 | Jenny | October 8, 1929 |
| 2,481,846 | King | September 13, 1949 |
| 2,521,915 | Hartig | September 12, 1950 |
| 3,034,713 | Kuzenko | May 15, 1962 |
| 3,137,443 | Samuelson | June 16, 1964 |
| 3,414,190 | Lemiesz | December 3, 1968 |

Generally, various navigational methods exist for directing the movement of a craft from one place to another, including piloting, dead reckoning, celestial navigation, as well as numerous electronic devices or techniques. The choice of a particular method depends to a large extent on the type of craft. For example, a relatively slow-moving ship or land vehicle may use a different method of navigation than a relatively fast-moving aircraft, missile, or spacecraft. One commonly used method for navigating small water-going vessels is dead reckoning which may utilize plane right triangles to determine the distance a craft is believed to have moved.

Many instruments exist which can solve a plane right triangle, but most of them are designed for mathematical use and are not adapted or suitable for navigation. On the other hand, devices specially adapted for performing navigational calculations by mechanical means are very often rather cumbersome or tedious, or do not provide sufficient information due to insufficient input capability. For example, U.S. Pat. No. 1,439,936, although providing a full complement of input and output values, utilizes logarithmic slide rule scales thereby making it difficult to set and difficult to read, and also is mechanically complicated in terms of both construction and operation.

It is a principle object of the present invention therefore to provide an improved navigational calculating device.

Another object of the present invention is to provide a mechanical navigational calculating device which is relatively simple to operate.

It is a further object of the present invention to provide a mechanical navigational calculating device which is uncomplicated in construction.

Other objects, features and advantages of the present invention will become apparent from the subsequent description and examples, and the appended claims taken in conjunction with the accompanying drawings.

SUMMARY OF THE INVENTION

In accordance with the present invention, a navigational calculating device is provided which with one setting requiring two operations can provide the information necessary to solve any plane sailing problem. The device can perform three principal functions: First, when set for course and distance run on that course, both departure (the distance removed east or west) and difference of latitude (the distance removed north or south) can be read directly off the instrument without any further setting or computation. Second, when set for departure and difference of latitude, the course and the distance to the destination can be read off the instrument. And third, when set for latitude, departure can be converted to difference of longitude, or difference of longitude can be converted to departure. Also, if any combination of two known arguments (course, distance, difference of latitude, departure) are entered on the instrument it can solve for the other two. The design of the invention lends itself to economical construction and can easily be molded from either opaque or transparent plastic.

BRIEF DESCRIPTION OF THE DRAWINGS

The foregoing objects and others will be pointed out more fully hereinafter in conjunction with the description of the preferred embodiment of the present invention illustrated in the accompanying drawings and examples and in which:

FIGS. 2 to 4 are plan views of components of the device.

DESCRIPTION OF THE PREFERRED EMBODIMENT

Figure 1:
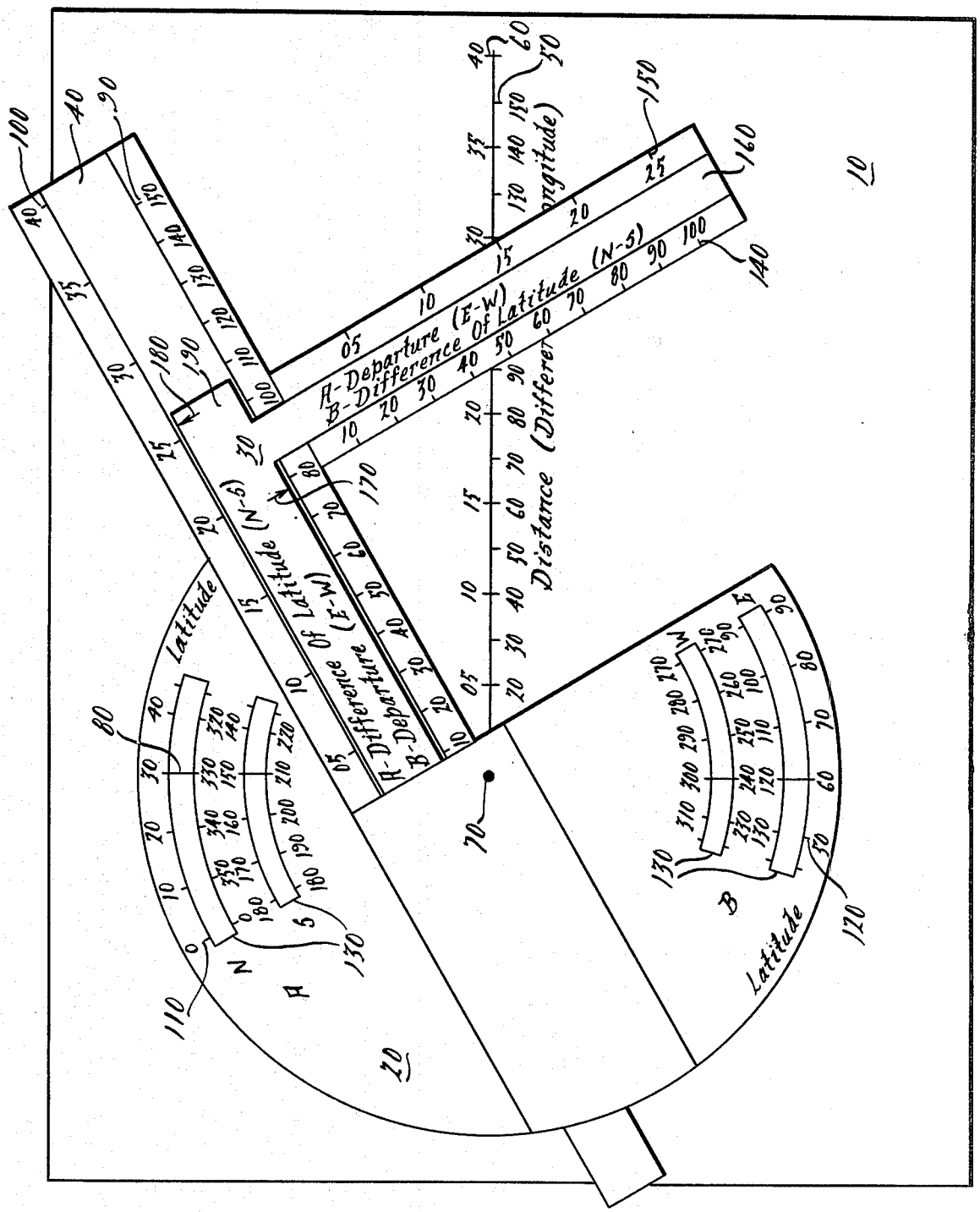
FIG. 1 is a plan view of a device embodying the invention.

Referring now to the drawings wherein the showings are for the purpose of illustrating a preferred embodiment of the invention only and are not for the purpose of limiting the invention, FIG. 1 shows the three major components comprising the present invention: a base plate 10, a rotating disk 20 with an arm, and a sliding square 30. Each of these three components is separately shown in FIGS. 2 to 4 respectively. Rotating disk 20 is rotatably attached to base plate 10, and sliding square 30 is slidably mounted on and relative to the arm 40 which extends from and is preferably, although not necessarily, an integral part of rotating disk 20. The disk and arm rotate over a 45° arc and the sliding square slides linearly back and forth over the length of arm 40.

The base plate 10 is printed with or otherwise has depicted thereon two horizontal distance scales 50 and 60 extending from a pivot point 70 and a vertical pointer line 80 running through the pivot point 70 perpendicular to the horizontal scales 50 and 60. The rotating disk 20 and arm 40 is similarly provided with two distance scales 90 and 100 extending from the pivot point 70, with the sliding square 30 slidably mounted therein. The dual scale arrangement provides versatility and greater accuracy for various distances. It permits solving for every conceivable combination of distances. These scales can be interpreted as any unit of measurement or distance, but for navigational use should be read as nautical miles. They may also be read decimally as on a slide rule. On the rotating disk 20 are eight segments of a compass "rose". Each segment represents one octant of the compass. The segments are arranged so that the most northern (NNE, NNW) and most southern (SSE, SSW) octants are at the top and the most eastern (ENE, ESE) and most western (WNW, WSW) octants are at the bottom. The upper section of the disk is labeled A and the calculated results would be read as indicated on the sliding square. The lower section of the disk is labeled B and the calculated results would be just the opposite of section A as labeled on the square. The first octant 110 (0°–45°) is at the very top of the disk and the second octant 120 (45°–90°) is at the very bottom. This is to facilitate setting the instrument for latitude. The apertures 130 are necessary only if the rotating disk is opaque. It should be noted that the lower edge of the horizontal arm 40 is colinear with the pivot point 70. The 0°, 90°, 180°, and 270° points are colinear with the pivot point 70.

The sliding square 30 is provided with two distance scales 140 and 150 on the vertical arm 160 and two pointers 170 and 180 on the horizontal arm 190, one pointer for the upper scale and one for the lower scale. The pointers 170 and 180 are aligned with the edges of the vertical arm 160. The sliding square 30 is constructed so that its horizontal arm 190 slidably fits into the rotating arm 40 of the disk 20 and so that the vertical arm 160 fits flush with the lower edge of the rotating arm 40. Thus, the zero points on the distance scales 140 and 150 are on a line extending from the pivot point 70.

FIG. 1 illustrates the operation of the instrument. To solve a dead reckoning problem, the distance run on a given course must be known. The calculator of the present invention does not compute the new position, it only computes the change of position. The disk 20 is rotated until the vertical line 80 on the base intersects the course on the vertical pointer line 80. In the illustration, the device is set for 30°. This same setting applies to the seven other courses aligned with the vertical line 80. The sliding square 30 is positioned so that the edge of the vertical arm 160 intersects the distance run on the scale on the base plate 50 or 60. In the illustration, it is set for 90 miles (or 29.5 miles on the upper scale). The difference of latitude, 78 minutes, (or 25.5 minutes on the upper scale) is read from the horizontal arm 190 and the departure, 45 miles (or 14.7 miles) is read from the vertical arm 160. (Hereafter, difference of latitude will be referred to as nautical miles which are considered to be the equivalent of minutes of latitude.) This means that the vessel is 78 miles north and 45 miles east of its original position. If the course is interpreted as 60°, the results are reversed with difference of latitude being 45 miles and departure being 78 miles. If the course were 330°, the vessel would be 78 miles north and 45 miles west. If the course were 120°, the vessel would be 78 miles east and 45 miles south of the original position. The difference of latitude is always greater than departure when on one of the courses at the top of the disk. The departure is always greater when on one of the courses at the bottom of the disk.

The instrument can also be used to find the course to be steered and the distance to the destination. To solve for course and distance, the difference of latitude and the departure must be known. As also shown in FIG. 1, the departure, 255 miles, is set by positioning the sliding square 30 at 255 on the upper scale 100. The disk 20 is rotated until the difference of latitude, 147 miles on the distance scale 150 of the vertical arm 160, intersects the scale 60 on the base plate. The reading on the base plate at the point of the intersection, 294 miles, is the distance to the destination. The larger number is always entered on the horizontal arm. Since the larger number is the departure, the course will be read from the bottom of the disk. Which of the four possible courses (60, 120, 240, or 300 degrees) will be selected depends on the general direction of the destination. In actual practice, there should be no problem with ambiguity.

In some navigation problems it is necessary to convert nautical miles to minutes of longitude, or vice-versa. In solving problems of this nature, the degree scales 110 and 120 (0 to 45 degrees and 45 to 90 degrees) are set for and interpreted as degrees of latitude. The distance scale on the base plate 50 or 60 is set for and read as minutes of longitude. If the latitude is less than 45 degrees, the departure is entered on or read from the distance scale 90 or 100 on the horizontal arm 190. If the latitude is greater than 45 degrees, the departure is entered on or read from the vertical arm 160 of the sliding square 30. Assume that, in FIG. 1, the departure, 78 miles, is to be converted to difference of longitude in order to determine the longitude of the new position. The rotating disk 20 is set for 30 degrees latitude which is the middle-latitude between the previous position and the new position. For most short distance situations, the nearest half-degree of latitude is sufficiently accurate. The sliding square 30 is set for 78 miles on the horizontal arm 190. The difference of longitude, 90 minutes, is read from the difference of longitude scale 50 or 60 on the base plate 10 at the point of intersection with the vertical arm 160. Assume that (in FIG. 1) the middle-latitude is 60 degrees and that the difference of longitude, 90 minutes, is to be converted to departure. The rotating disk 20 is set for 60 degrees latitude and the sliding square 30 is set so that the vertical arm 160 intersects the longitude scale 50 or 60 at 90 minutes. The departure, 45 miles, is read from the vertical arm 160 at the point of intersection.

Some of the construction features which may be desirable, although not necessary, in a preferred embodiment of the present invention include the following:

1. The base plate 10 should be large enough so that it can be stored with no movable part protruding beyond the edge.

2. The disk 20 should be large enough to accommodate a clearly readable compass rose and to provide an adequate recess for the sliding square 30 when fully extended.

3. The degree scales should be grouped so that the same results will apply to any course in that group.

4. Some segments of the compass rose should read clockwise and some counter-clockwise to facilitate a 45° arc instead of a 90° arc. Using a 45° arc requires much shorter distance scales than does a 90° arc. It also permits locating the degree scales where they will not be obstructed by movements of the sliding square.

5. A 150 mile scale should be used to permit readings up to 100 miles on the vertical arm when set for 45°. This in turn permits readings to any quantity by interpreting the scales decimally.

6. A second scale should be provided to permit more accurate readings for distance under 40 miles and for distances over 150 miles.

7. The horizontal scale should begin at 10 permitting stronger construction around the pivot point. Distances under 10 miles may be read decimally from the 10 to 100 miles portion of the scale like a slide rule.

8. The horizontal arm should have a recessed groove to minimize misalignment of the sliding square. A tongue and groove slide rule type arrangement is appropriate.

9. The vertical arm should be constructed so it will lie flat on the base plate with the upper end flush with the edge of the horizontal arm.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A navigational calculating device comprised of:
   (a) a base plate containing intersecting horizontal and vertical scales,
   (b) a disk rotatably mounted on said base plate at a position coincident with the intersection of said horizontal and vertical scales, said disk comprising at least one radially spaced arcuate scale coaxial with said disk and superimposed over the vertical scale on the base plate, said arcuate scale being of constant radius and having an origin radially aligned with the intersection of said scales on said base plate, said disk having an arm affixed thereto, the lower edge of which is aligned with said intersection of the scales on the base plate, said arm containing at least one longitudinal scale, and
   (c) a square slidably mounted on said arm, said square comprising both a vertical portion having an upper edge adjacent the lower edge of said arm and containing at least one scale having its origin aligned with the intersection of the scales on the base plate, and a horizontal portion integral with said vertical portion adapted for sliding movement relative to said arm, said horizontal portion containing at least one pointer spaced apart from and aligned with an edge of said vertical portion.

2. The navigational calculating device of claim 1 wherein said disk comprises an arcuately shaped aperture adjacent said arcuate scale.

3. The navigational calculating device of claim 1 wherein said disk has at least one transparent area.

4. The navigational calculating device of claim 1 wherein said horizontal scale on the base plate is marked 10–150 and 5–40.

5. The navigational calculating device of claim 1 wherein said disk comprises eight radially spaced arcuate scales coaxial with said disk, each scale having an origin radially aligned with the intersection of the scales on the base plate.

6. The navigational calculating device of claim 5 wherein said scales are marked 0–45, 0–315 (360–315), 180–135, 180–225, 315–270, 225≧270, 135–90 and 45–90 respectively.

7. The navigational calculating device of claim 1 wherein said arm comprises two longitudinal scales which are arranged one adjacent each horizontal opposing edge of the horizontal portion of said sliding square.

8. The navigational calculating device of claim 7 wherein said longitudinal scales are marked 5–40 and 10–150 respectively.

9. The navigational calculating device of claim 1 wherein said vertical portion comprises two scales having their origin aligned with the intersection of the scales on the base plate.

10. The navigational calculating device of claim 9 wherein said scales on the vertical portion of the square are marked 0–25 and 0–100 respectively.

11. The navigational calculating device of claim 1 wherein said horizontal portion comprises two pointers facing in opposite directions, each being spaced apart from and aligned with opposing edges of the vertical portion of the sliding square.

12. The navigational calculating device of claim 1 wherein said base plate is larger in longitudinal and transverse dimensions than the disk or sliding square.

13. The navigational calculating device of claim 1 wherein said sliding square is mounted in said arm by a tongue and groove.

* * * * *

UNITED STATES PATENT AND TRADEMARK OFFICE
CERTIFICATE OF CORRECTION

PATENT NO. : 4,208,805
DATED : June 24, 1980
INVENTOR(S) : David M. McEwen

It is certified that error appears in the above—identified patent and that said Letters Patent are hereby corrected as shown below:

Column 6, line 11, Claim 6, "225≧270" should be --225-270--.

Signed and Sealed this

Seventh Day of October 1980

[SEAL]

Attest:

SIDNEY A. DIAMOND

Attesting Officer

Commissioner of Patents and Trademark